United States Patent
Sato

(10) Patent No.: US 10,470,224 B2
(45) Date of Patent: Nov. 5, 2019

(54) WIRELESS COMMUNICATION SYSTEM, REPEATER, WIRELESS TERMINAL, AND WIRELESS COMMUNICATION METHOD

(71) Applicant: NEC Platforms, Ltd., Kawasaki-shi, Kanagawa (JP)

(72) Inventor: Tomohiro Sato, Kanagawa (JP)

(73) Assignee: NEC PLATFORMS, LTD., Kanagawa (JP)

( * ) Notice: Subject to any disclaimer, the term of this patent is extended or adjusted under 35 U.S.C. 154(b) by 68 days.

(21) Appl. No.: 15/748,249

(22) PCT Filed: Mar. 23, 2016

(86) PCT No.: PCT/JP2016/001658
§ 371 (c)(1),
(2) Date: Jan. 29, 2018

(87) PCT Pub. No.: WO2017/029769
PCT Pub. Date: Feb. 23, 2017

(65) Prior Publication Data
US 2018/0220490 A1   Aug. 2, 2018

(30) Foreign Application Priority Data
Aug. 20, 2015   (JP) .................................. 2015-162494

(51) Int. Cl.
*H04W 76/10* (2018.01)
*H04W 92/18* (2009.01)
(Continued)

(52) U.S. Cl.
CPC ........... *H04W 76/10* (2018.02); *H04W 92/18* (2013.01); *H04L 61/6022* (2013.01);
(Continued)

(58) Field of Classification Search
CPC ..... H04W 92/18; H04W 76/10; H04W 88/04; H04W 8/005; H04W 84/12; H04L 61/6022
See application file for complete search history.

(56) References Cited

U.S. PATENT DOCUMENTS 8,817,788 B2 * 8/2014 Kakumaru ........ H04W 36/0016
370/331
2005/0096027 A1   5/2005 Takahashi et al.
(Continued)

FOREIGN PATENT DOCUMENTS

JP     2005-136591 A    5/2005
JP     2005-341404 A    12/2005
(Continued)

OTHER PUBLICATIONS

Japanese Office Action for JP Application No. 2015-162494 dated Apr. 19, 2016 with English Translation.
(Continued)

*Primary Examiner* — Tejis Daya

(57) ABSTRACT

The present invention is intended to provide a method which does not cause degradation of security and communication obstruction in an assigned terminal and is not limited by a button operation when an unassigned terminal is assigned to a repeater by use of the assigned terminal. A wireless communication system according to the present invention comprises: a wireless-communication repeater; and first and second wireless terminals for wirelessly communicating with the repeater, wherein, when the first wireless terminal is assigned to the repeater, and the second wireless terminal attempts to be assigned to the repeater, the second wireless terminal transmits a presence notification; when receiving the presence notification, the first wireless terminal transmits an invitation request based on the presence notification to the repeater; when receiving the invitation request, further
(Continued)

receiving the presence notification, and confirming that the invitation request and the presence notification both pertain to the second wireless terminal, the repeater transmits a connection start request to the second wireless terminal; when receiving the connection start request, the second wireless terminal transmits a connection start response to the repeater; and connection is started between the repeater and the second wireless terminal.

17 Claims, 8 Drawing Sheets

(51) Int. Cl.
    *H04W 84/12*     (2009.01)
    *H04L 29/12*     (2006.01)
    *H04W 8/00*     (2009.01)
    *H04W 88/04*     (2009.01)

(52) U.S. Cl.
    CPC ............ *H04W 8/005* (2013.01); *H04W 84/12* (2013.01); *H04W 88/04* (2013.01)

(56) References Cited

U.S. PATENT DOCUMENTS

| | | | | |
|---|---|---|---|---|
| 2005/0107102 A1* | 5/2005 | Yoon | ................... | H04W 74/00 455/466 |
| 2008/0098105 A1* | 4/2008 | Okada | ................... | G06Q 10/06 709/223 |
| 2011/0256891 A1* | 10/2011 | Soliman | ................ | H04W 68/12 455/458 |
| 2013/0157679 A1* | 6/2013 | Van Phan | ............. | H04W 76/14 455/452.2 |
| 2013/0252621 A1* | 9/2013 | Dimou | ................ | H04W 72/082 455/450 |
| 2015/0230208 A1* | 8/2015 | Ukita | ................ | H04W 28/0278 370/329 |

FOREIGN PATENT DOCUMENTS

| | | |
|---|---|---|
| JP | 2006-186616 A | 7/2006 |
| JP | 2007-110190 A | 4/2007 |
| JP | 2007-189301 A | 7/2007 |
| JP | 2010-016690 A | 1/2010 |
| JP | 2010-219754 A | 9/2010 |

OTHER PUBLICATIONS

Japanese Office Action for JP Application No. 2015-162494 dated Oct. 25, 2016 with English Translation.
International Search Report for PCT Application No. PCT/JP2016/001658, dated Apr. 26, 2016.
English translation of Written opinion for PCT Application No. PCT/JP2016/001658.

* cited by examiner

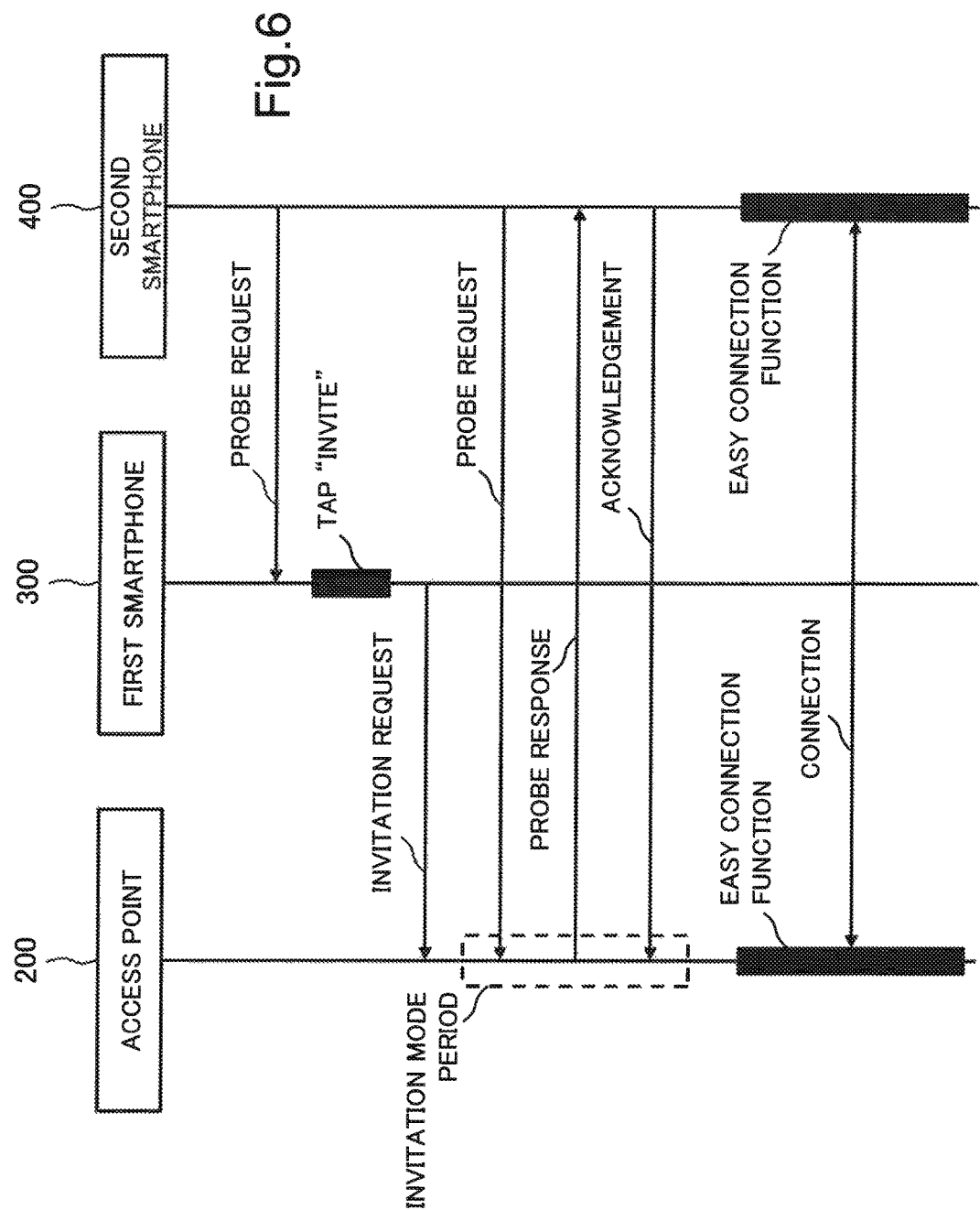

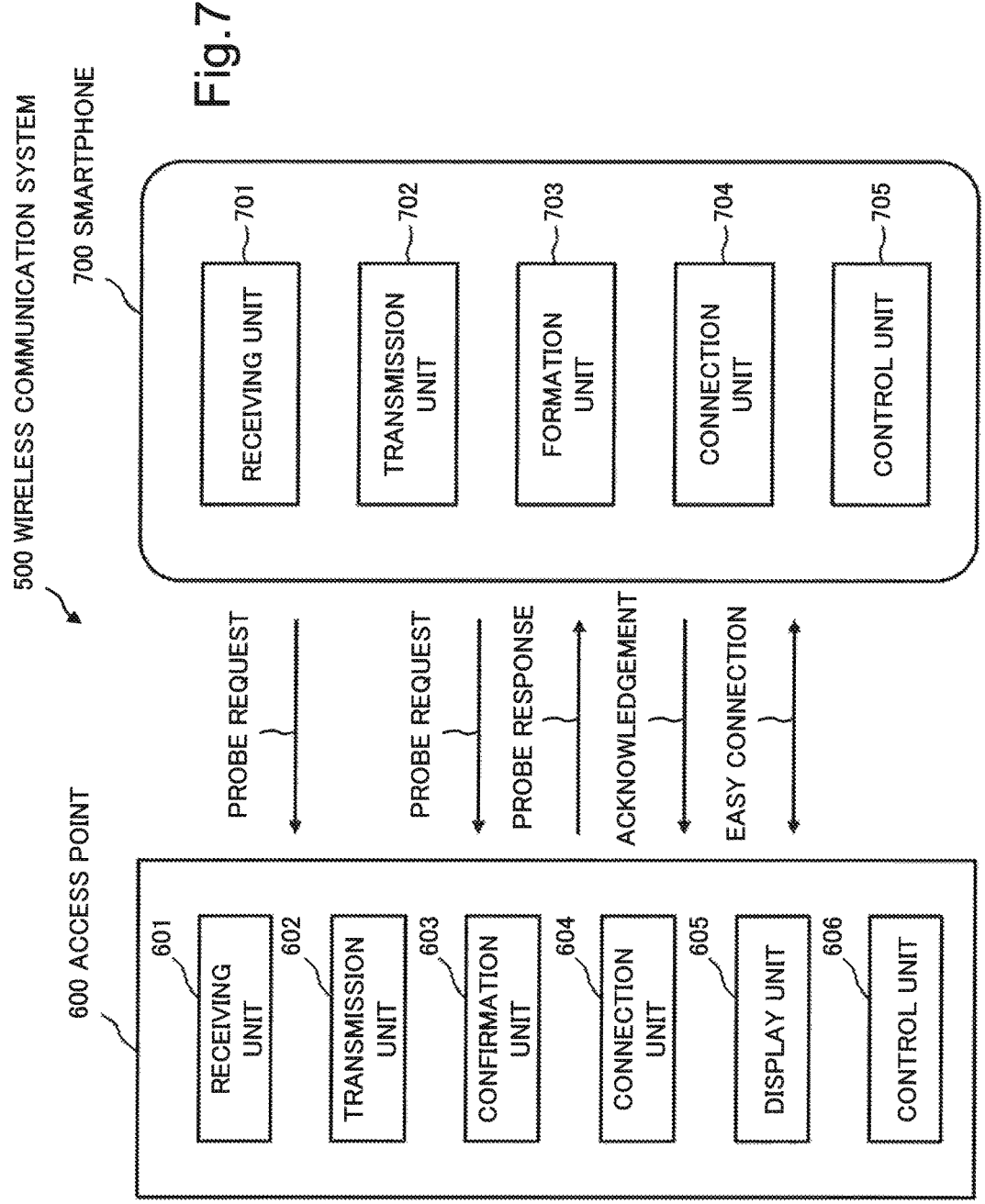

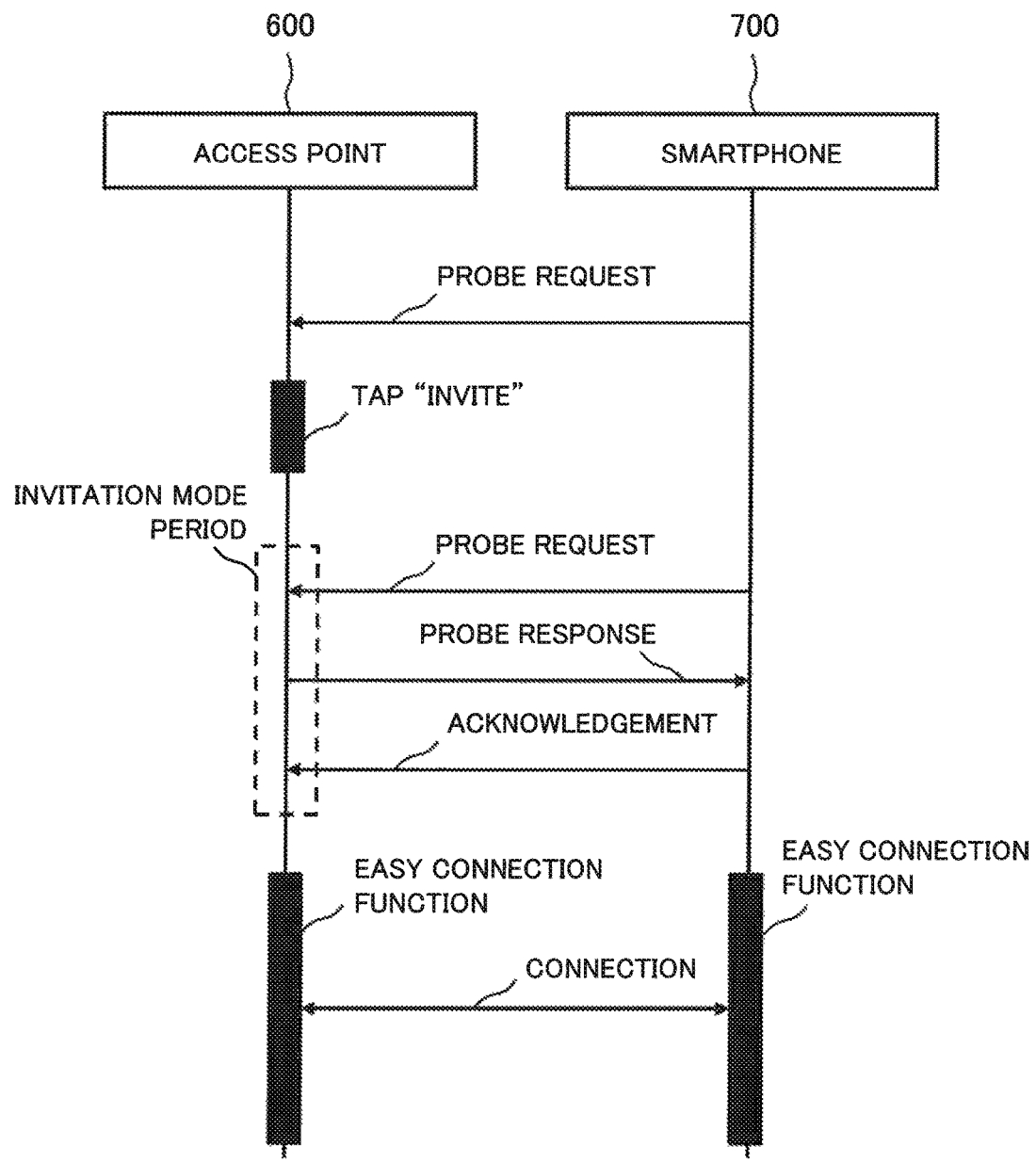

WIRELESS COMMUNICATION SYSTEM, REPEATER, WIRELESS TERMINAL, AND WIRELESS COMMUNICATION METHOD

This application is a National Stage Entry of PCT/JP2016/001658 filed on Mar. 23, 2016, which claims priority from Japanese Patent Application 2015-162494 filed on Aug. 20, 2015, the contents of all of which are incorporated herein by reference, in their entirety.

TECHNICAL FIELD

The present invention relates to a communication technique, and in particular, to a wireless local area network (LAN) technique.

BACKGROUND ART

Along with spread of a wireless LAN, there have been increasing environments where the wireless LAN is available at home and outdoors. In addition, due to spread of wireless terminals such as a smartphone and a tablet terminal, there are increasing opportunities in which even people who do not know much about an information device use a wireless LAN. When using a wireless LAN, it is necessary to assign a wireless terminal being a slave unit to an access point (repeater) being a master unit. To this end, a user of the wireless terminal needs to manually input a service set identifier (SSID) which is an identification name of the access point, and a password. However, this input work requires a certain degree of knowledge about a wireless LAN, and is troublesome for the user.

Easy connection functions such as a Wi-Fi (registered trademark) protected setup (WPS) function and Rakuraku Wireless Start have been developed as functions that lessen the trouble and thus easily assign the wireless terminal to the access point. For performing wireless connection by using the WPS function, a personal identification number (PIN) code scheme and a push button configuration (PBC) scheme are available.

The PIN code scheme requires input of a PIN code displayed on an equipment main unit of the access point or on a setting screen. The input of this PIN code is troublesome for a user, and may not necessarily be said to be an easy operation especially for a user who is not familiar with the term PIN code and does not know much about an information device.

On the other hand, the PBC scheme and the Rakuraku Wireless Start require buttons provided in both an access point and a wireless terminal to be pushed within a certain period of time. A user needs to find the buttons in the access point and the wireless terminal, respectively, and may fail connection when being unable to start connecting operations in both within a certain period of time, and therefore this is not necessarily an easy operation for a user who does not know much about an information device.

Furthermore, a scheme in which buttons are physically pressed requires an access point and a wireless terminal to be present at near positions. However, an access point that is finished with initial setting is often located in a place not being much touched normally, and an access point is rarely present within reach in a situation where a new wireless terminal is added to an existing wireless LAN. Further, the button pressing scheme is not applicable to a case where a wireless terminal is an extremely small device such as a sensor device and a button is not mountable therein due to a mechanical limitation.

As a method for easily assigning a terminal to an access point, PTLs 1 and 2 disclose a method for assigning an unassigned terminal by using a terminal already assigned to an access point.

In PTL 1, an SSID and an encrypted password of an access point are broadcast from a terminal assigned to the access point, and an unassigned terminal receiving the SSID and the password is assigned to the access point with reference to this information.

Furthermore, in PTL 2, an assigned terminal acquires identification information of an unassigned terminal from the unassigned terminal, acquires initial setting information corresponding to the identification information from an access point, and then distributes the initial setting information to the unassigned terminal. The unassigned terminal is assigned to the access point, based on this initial setting information. At this point, the assigned terminal performs wireless LAN communication with the unassigned terminal. To this end, the assigned terminal is also compliant with an access point mode or an ad hoc mode in addition to a terminal mode as an operation mode of a wireless LAN. PTL 3 also discloses a related art, wherein a terminal has an access point mode and a terminal mode, and one of the modes is suitably set.

CITATION LIST

Patent Literature

[PTL 1] Japanese Laid-open Patent Publication No. 2005-136591
[PTL 2] Japanese Laid-open Patent Publication No. 2007-110190
[PTL 3] Japanese Laid-open Patent Publication No. 2010-16690

SUMMARY OF INVENTION

Technical Problem

In the method in PTL 1, an SSID and an encrypted password are broadcast. Since communication interception is easy in a wireless LAN, this method has a problem in security.

In the method in PTL 2, an assigned terminal needs to perform wireless LAN communication with an unassigned terminal. Therefore, while performing wireless LAN communication with the unassigned terminal, the assigned terminal is disconnected from an access point to which this terminal is assigned. In other words, this method has a problem of obstruction of an original communication between the assigned terminal and the access point. Further, in the case of reconnection to the once disconnected access point, there is a possibility of connecting to an access point that is not intended by a user when a plurality of connectable access points are present. Such a situation is difficult for a user who does not know much about an information device, and poses a problem in terms of usability for a user.

The present invention has been made in view of the above problems, and an object of the present invention is to provide a method which does not cause degradation of security and communication obstruction in an assigned terminal and is not limited by a button operation when an unassigned terminal is assigned to a repeater by use of the assigned terminal.

Solution to Problem

A wireless communication system according to the present invention comprises a wireless-communication repeater;

and first and second wireless terminals for wirelessly communicating with the repeater, wherein, when the first wireless terminal is assigned to the repeater, and the second wireless terminal attempts to be assigned to the repeater, the second wireless terminal transmits a presence notification; when receiving the presence notification, the first wireless terminal transmits an invitation request based on the presence notification to the repeater; when receiving the invitation request, further receiving the presence notification, and confirming that the invitation request and the presence notification both pertain to the second wireless terminal, the repeater transmits a connection start request to the second wireless terminal; when receiving the connection start request, the second wireless terminal transmits a connection start response to the repeater; and connection is started between the repeater and the second wireless terminal.

A repeater according to the present invention comprises: a receiving unit which receives an invitation request of an unassigned wireless terminal transmitted from an assigned wireless terminal, and a presence notification and a connection start response of an unassigned wireless terminal which are transmitted from the unassigned wireless terminal; a confirmation unit which confirms that the invitation request and the presence notification both pertain to the unassigned wireless terminal; a transmission unit which transmits a connection start request to the unassigned wireless terminal, based on the confirmation; and a connection unit which starts connection to the unassigned wireless terminal when the receiving unit receives the connection start response after the transmission unit transmits the connection start request.

A wireless terminal according to the present invention comprises: a receiving unit which receives a presence notification transmitted from an unassigned wireless terminal attempting to be assigned to a wireless-communication repeater; a formation unit which forms an invitation request of the unassigned wireless terminal on receipt of the presence notification; and a transmission unit which transmits the invitation request to the repeater.

A wireless terminal according to the present invention comprises: a transmission unit which transmits a presence notification; a receiving unit which receives a connection start request transmitted by a repeater, based on an invitation request and the presence notification, the invitation request being formed based on the presence notification and transmitted by an assigned wireless terminal assigned to the repeater; and a connection unit which connects to the repeater, wherein, when the receiving unit receives the connection start request, and the transmission unit transmits, based on the connection start request, a connection start response, the connection unit starts the connection.

A wireless communication method according to the present invention is for a wireless communication system comprising a wireless-communication repeater, and first and second wireless terminals for wirelessly communicating with the repeater, in which the first wireless terminal is assigned to the repeater, and the second wireless terminal attempts to be assigned to the repeater, the method comprising: by the second wireless terminal, transmitting a presence notification; when receiving the presence notification, by the first wireless terminal, transmitting an invitation request based on the presence notification to the repeater; when receiving the invitation request, further receiving the presence notification, and confirming that the invitation request and the presence notification both pertain to the second wireless terminal, by the repeater, transmitting a connection start request to the second wireless terminal; when receiving the connection start request, by the second wireless terminal, transmitting a connection start response to the repeater; and starting connection between the repeater and the second wireless terminal.

Advantageous Effects of Invention

According to the present invention, it is possible to provide a method which does not cause degradation of security and communication obstruction in an assigned terminal and is not limited by a button operation when an unassigned terminal is assigned to a repeater by use of the assigned terminal.

BRIEF DESCRIPTION OF DRAWINGS

FIG. 6 is a flowchart illustrating a wireless communication method according to the third example embodiment of the present invention;

FIG. 7 is a block diagram illustrating a configuration of a wireless communication system according to a fourth example embodiment of the present invention; and FIG. 8 is a flowchart illustrating a wireless communication method according to the fourth example embodiment of the present invention.

DESCRIPTION OF EMBODIMENTS

Hereinafter, example embodiments of the present invention will be described in detail with reference to drawings. However, while limitations that are technically preferable for carrying out the present invention are put on the example embodiments described below, the scope of the invention is not limited to the followings.

First Example Embodiment

Figure 1:
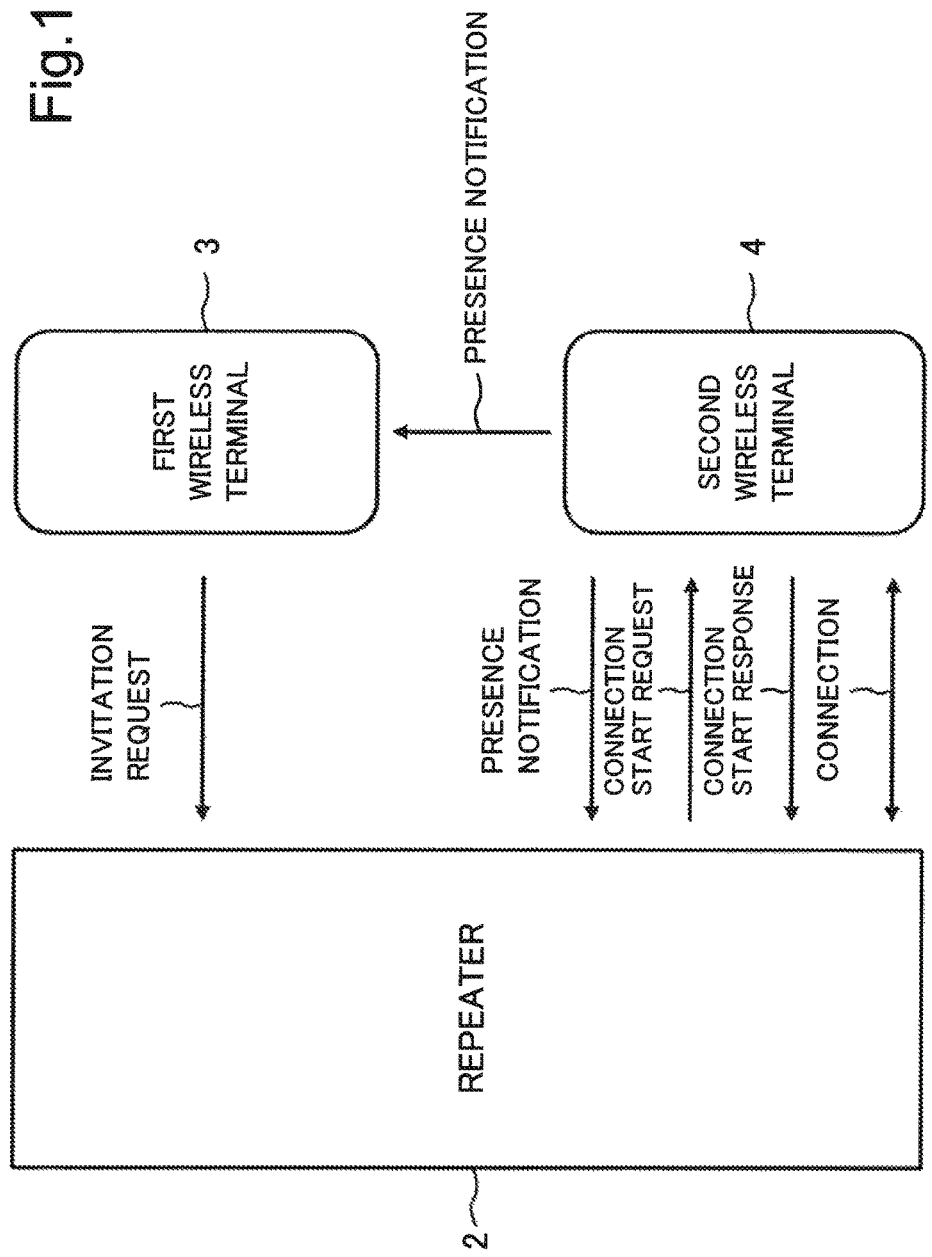
FIG. 1 is a block diagram illustrating a configuration of a wireless communication system according to a first example embodiment of the present invention.

FIG. 1 is a block diagram illustrating a configuration of a wireless communication system according to a first example embodiment of the present invention. A wireless communication system 1 according to the present example embodiment comprises a wireless-communication repeater 2, and a first wireless terminal 3 and a second wireless terminal 4 for wirelessly communicating with the repeater 2, the first wireless terminal 3 being assigned to the repeater 2, and the second wireless terminal 4 attempting to be assigned to the repeater 2, wherein the second wireless terminal 4 transmits a presence notification; when receiving the presence notification, the first wireless terminal 3 transmits an invitation request based on the presence notification to the repeater 2; when receiving the invitation request, further receiving the presence notification, and confirming that the invitation request and the presence notification both pertain to the second wireless terminal 4, the repeater 2 transmits a connection start request to the second wireless terminal 4; when receiving the connection start request, the second wireless terminal 4 transmits a connection start response to the repeater 2; and a connection is started between the repeater 2 and the second wireless terminal 4.

Figure 2:
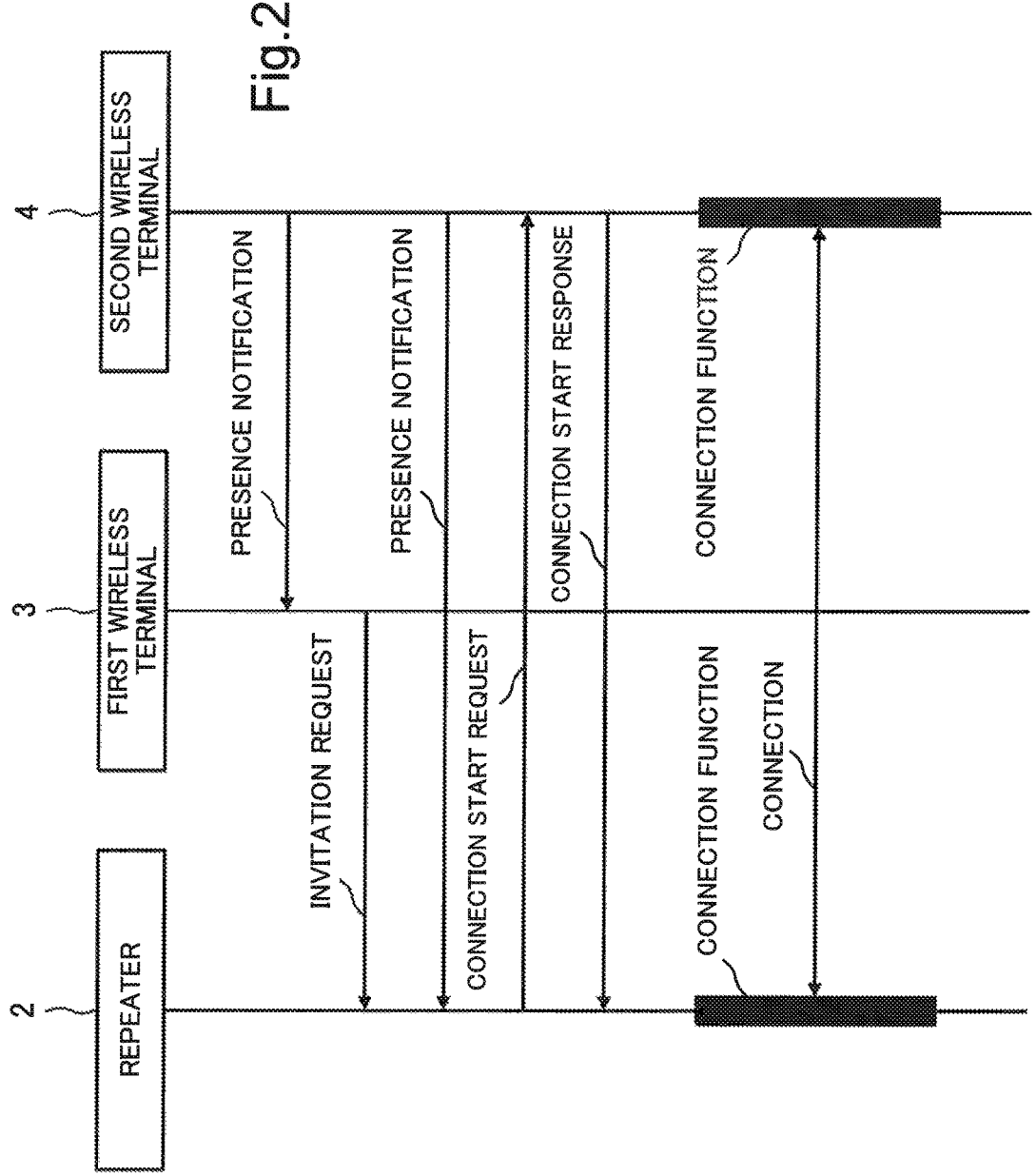
FIG. 2 is a flowchart illustrating a wireless communication method according to the first example embodiment of the present invention.

FIG. 2 is a flowchart illustrating a wireless communication method according to the present example embodiment. A wireless communication method of the present example embodiment is for a wireless communication system comprising a wireless-communication repeater 2, and a first wireless terminal 3 and a second wireless terminal 4 for wirelessly communicating with the repeater 2, the first wireless terminal 3 being assigned to the repeater 2, and the second wireless terminal 4 attempting to be assigned to the repeater 2, wherein the second wireless terminal 4 transmits a presence notification; when receiving the presence notification, the first wireless terminal 3 transmits an invitation request based on the presence notification to the repeater 2; when receiving the invitation request, further receiving the presence notification, and confirming that the invitation request and the presence notification both pertain to the second wireless terminal 4, the repeater 2 transmits a connection start request to the second wireless terminal 4; when receiving the connection start request, the second wireless terminal 4 transmits a connection start response to the repeater 2; and a connection is started between the repeater 2 and the second wireless terminal 4.

According to the present example embodiment, it is possible to provide a method which does not cause degradation of security and communication obstruction in an assigned terminal and is not limited by a button operation when an unassigned terminal is assigned to a repeater by use of the assigned terminal.

Second Example Embodiment

Figure 3:
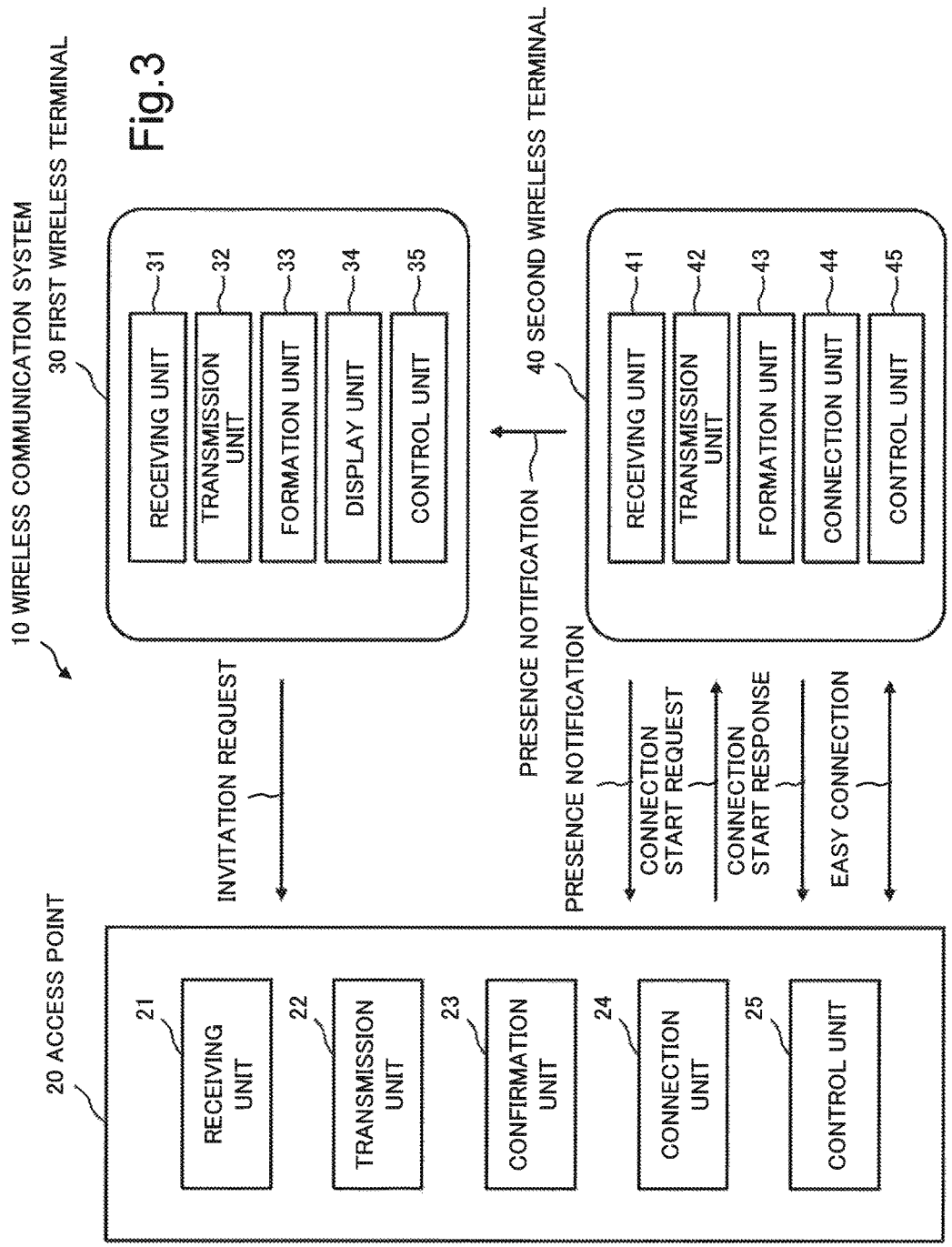
FIG. 3 is a block diagram illustrating a configuration of a wireless communication system according to a second example embodiment of the present invention.

FIG. 3 is a block diagram illustrating a configuration of a wireless communication system according to a second example embodiment of the present invention. A wireless communication system 10 according to the present example embodiment has an access point 20 for wireless LAN communication, and a first wireless terminal 30 and a second wireless terminal 40 for performing wireless LAN communication with the access point 20.

When the first wireless terminal 30 is assigned to the access point 20, and the second wireless terminal 40 is to be assigned to the access point 20, the second wireless terminal 40, first, periodically broadcasts a presence notification for its own representation. When receiving the presence notification, the first wireless terminal 30 forms an invitation request of the second wireless terminal 40 based on the presence notification, and transmits the invitation request to the access point 20.

The presence notification comprises a fact that the second wireless terminal 40 is compliant with a scheme according to the present example embodiment in which a connection to an access point is started via an assigned wireless terminal, and a MAC address and a terminal name of the second wireless terminal 40. The invitation request comprises the MAC address of the second wireless terminal 40.

When receiving the invitation request, and further receiving the periodically broadcast presence notification, the access point 20 confirms whether or not the MAC address in the presence notification corresponds to the MAC address in the invitation request. When confirming the correspondence, the access point 20 transmits a connection start request to the second wireless terminal 40. When receiving the connection start request, the second wireless terminal 40 transmits a connection start response to the access point 20. An easy connection is started between the access point 20 and the second wireless terminal 40.

The access point 20 comprises a receiving unit 21, a transmission unit 22, a confirmation unit 23, a connection unit 24, and a control unit 25.

The receiving unit 21 receives the invitation request transmitted from the first wireless terminal 30, and the presence notification and the connection start response which are transmitted from the second wireless terminal 40. The receiving unit 21 may receive the presence notification after receiving the invitation request.

The confirmation unit 23 confirms whether or not the MAC address in the presence notification corresponds to the MAC address in the invitation request.

When the confirmation unit 23 confirms that the MAC addresses correspond, the transmission unit 22 transmits the connection start request to the second wireless terminal 40.

When the receiving unit 21 receives the connection start respond from the second wireless terminal 40 after the transmission unit 22 transmits the connection start request to the second wireless terminal 40, the connection unit 24 starts an easy connection to the second wireless terminal 40. The easy connection may conform to an easy connection such as WPS or Rakuraku Wireless Start. By an operation according to the present scheme, an operation of the easy connection is started without such a connection start operation as physically pressing a button provided in a housing of the access point 20.

Moreover, it is assumed that when the receiving unit 21 receives an invitation request, the connection unit 24 shifts to an invitation mode for a predetermined period, and when, within this period, there is a probe request from a terminal to which the invitation request has been made, the connection unit 24 may shift to an operation for assigning this terminal to the access point 20.

The control unit 25 controls so that operations of the receiving unit 21, the transmission unit 22, the confirmation unit 23, and the connection unit 24 are linked.

The receiving unit 21 and the transmission unit 22 comprise antennas, and have circuits for performing wireless communication. The confirmation unit 23, the connection unit 24, and the control unit 25 have central processing units (CPUs), and are put into practice when a program is operated by the CPUs. The access point 20 may also have a memory as a storage unit for saving the received invitation request, presence notification, and the like.

The first wireless terminal 30 comprises a receiving unit 31, a transmission unit 32, a formation unit 33, a display unit 34, and a control unit 35.

The receiving unit 31 receives a presence notification transmitted from the second wireless terminal 40 attempting to be assigned to the access point 20.

When the receiving unit 31 receives the presence notification, the display unit 34 displays, to a user, the terminal name of the second wireless terminal 40, and a display inquiring about acceptability of the invitation request.

When a response to the inquiry from the display unit 34 is positive, the formation unit 33 forms an invitation request of the second wireless terminal 40. The invitation request comprises the MAC address of the second wireless terminal 40.

The transmission unit 32 transmits the invitation request formed by the formation unit 33 to the access point 20.

The control unit 35 controls so that operations of the receiving unit 31, the transmission unit 32, the formation unit 33, and the display unit 34 are linked.

The receiving unit 31 and the transmission unit 32 comprise antennas, and have circuits for performing wireless communication. The display unit 34 has, on its front surface, a liquid crystal monitor with a touch panel function. The formation unit 33 and the control unit 35 have CPUs, and are put into practice when a program is operated by the CPUs. The first wireless terminal 30 may also have a memory as a storage unit for saving the received presence notification, the formed invitation request, and the like.

The second wireless terminal 40 comprises a receiving unit 41, a transmission unit 42, a formation unit 43, a connection unit 44, and a control unit 45.

The formation unit 43 forms a presence notification of the second wireless terminal 40. The presence notification comprises a fact that the second wireless terminal 40 is compliant with the present scheme, and the MAC address and the terminal name of the second wireless terminal 40.

The transmission unit 42 broadcasts the presence notification formed by the formation unit 43. The transmission unit 42 also transmits a connection response notification to the access point 20.

The receiving unit 41 receives a connection start request transmitted from the access point 20.

When the receiving unit 41 receives the connection start request, and the transmission unit 42 transmits, based on the connection start request, a connection start response, the connection unit 44 starts an easy connection to the access point 20. The easy connection may conform to an easy connection such as WPS or Rakuraku Wireless Start.

The control unit 45 controls so that operations of the receiving unit 41, the transmission unit 42, the formation unit 43, and the connection unit 44 are linked.

The receiving unit 41 and the transmission unit 42 comprise antennas, and have circuits for performing wireless communication. The formation unit 43, the connection unit 44, and the control unit 45 have CPUs, and are put into practice when a program is operated by the CPUs. The second wireless terminal 40 may also have a memory as a storage unit for saving the formed presence notification and the like.

Note that the present example embodiment may be as follows: The second wireless terminal 40 transmits a presence notification and an assignment request, and when receiving the presence notification, the first wireless terminal 40 transmits an invitation request based on the presence notification to the access point 20. Furthermore, when receiving the invitation request, further receiving the assignment request, and confirming that the invitation request and the assignment request both pertain to the second wireless terminal 40, the access point 20 transmits a connection start request to the second wireless terminal 40. Moreover, when receiving the connection start request, the second wireless terminal 40 transmits a connection start response to the access point 20, and a connection is started between the access point 20 and the second wireless terminal 40. Note that the assignment request comprises a fact that assignment to the access point is requested, and the MAC address and the terminal name of the second wireless terminal 40. The assignment request may be a notification separate from the presence notification.

According to the present example embodiment, it is possible to assign an unassigned wireless terminal to an access point only by an easy operation of an assigned wireless terminal. Further, when a connection of the unassigned wireless terminal to the access point is started, an SSID and an encrypted password are not broadcast, which provides satisfactory security. Moreover, even when an assigned wireless terminal receives a presence notification from an unassigned wireless terminal, and transmits an invitation request to an access point, a wireless LAN between the assigned wireless terminal and the access point is not obstructed.

Furthermore, a connection between the unassigned wireless terminal and the access point may be started without any physical button operation, so that the access point, even when located at a far position, is connectable as far as communication is possible. The present example embodiment is also applicable to a case where a wireless terminal is an extremely small device such as a sensor device and a button is not mountable therein due to a mechanical limitation.

As described above, according to the present example embodiment, it is possible to provide a method which does not cause degradation of security and communication obstruction in an assigned terminal and is not limited by a button operation when an unassigned terminal is assigned to an access point by use of the assigned terminal.

Third Example Embodiment

Figure 4:
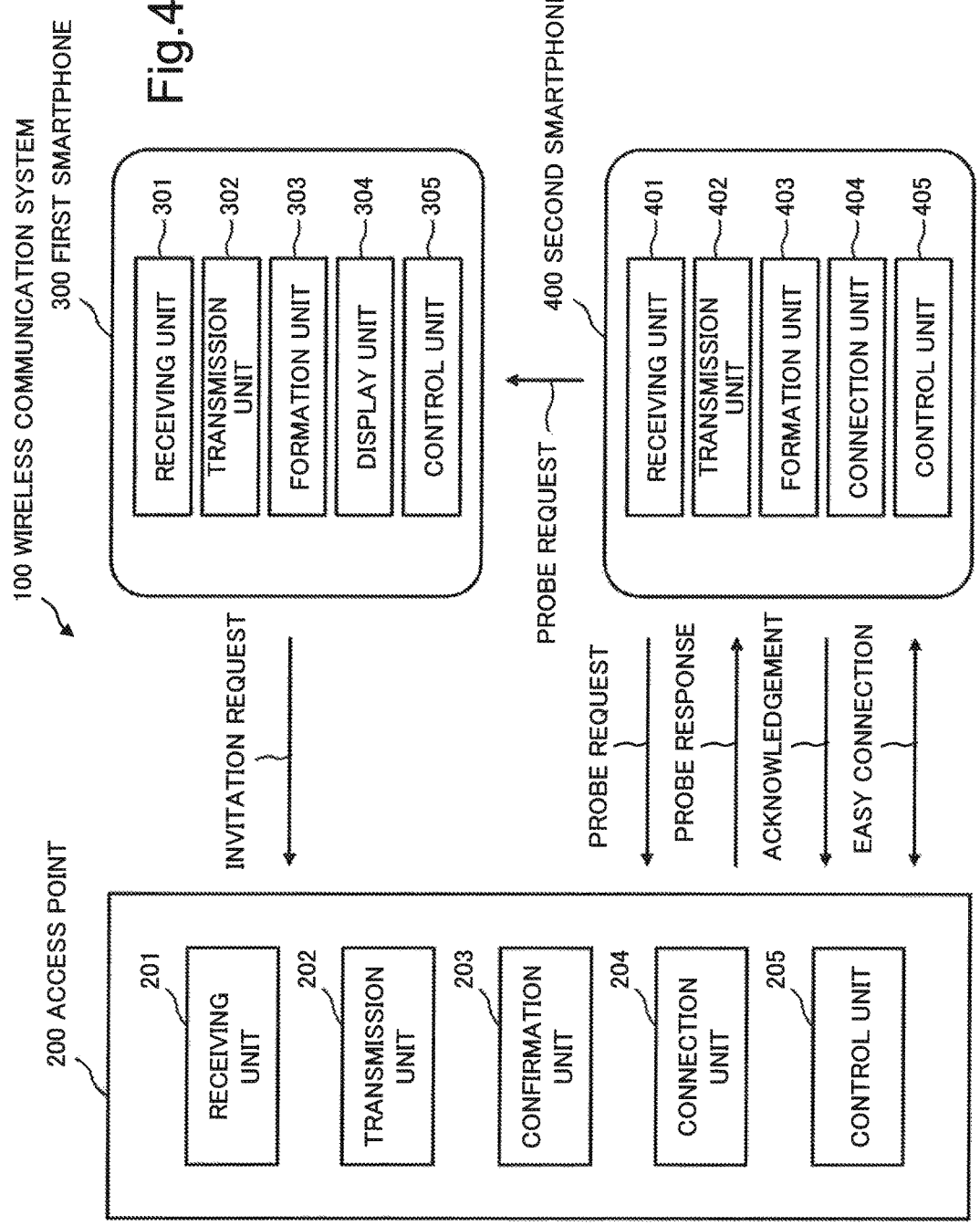
FIG. 4 is a block diagram illustrating a configuration of a wireless communication system according to a third example embodiment of the present invention.

FIG. 4 is a block diagram illustrating a configuration of a wireless communication system according to a third example embodiment of the present invention. A wireless communication system 100 according to the present example embodiment comprises an access point 200 for wireless LAN communication, and a first smartphone 300 and a second smartphone 400 for performing wireless LAN communication with the access point 200.

When the first smartphone 300 is assigned to the access point 200, and the second smartphone 400 is to be assigned to the access point 200, the second smartphone 400, first, periodically broadcasts a probe request for its own representation.

For the probe request, a region in which vendor's own information called vendor specific is put is prepared. The second smartphone 400 puts, in the vendor specific, a fact that the second smartphone 400 is compliant with a scheme according to the present example embodiment in which a connection to an access point is started via an assigned smartphone, and a MAC address and a terminal name of the second smartphone 400.

When receiving the probe request, the first smartphone 300 forms an invitation request of the second smartphone 400 based on the probe request, and transmits the invitation request to the access point 200. The invitation request comprises the MAC address of the second smartphone 400.

The access point 200 receives the invitation request, and further receives the periodically broadcast probe request. The access point 200 confirms whether or not the MAC address in the probe request corresponds to the MAC address in the invitation request. When confirming the correspondence, the access point 200 transmits a probe response to the second smartphone 400. When receiving the probe response, the second smartphone 400 transmits an acknowledgement (ACK) to the access point 200. An easy connection is started between the access point 200 and the second smartphone 400.

The access point 200 comprises a receiving unit 201, a transmission unit 202, a confirmation unit 203, a connection unit 204, and a control unit 205.

The receiving unit 201 receives the invitation request of the unassigned second smartphone 400 transmitted from the assigned first smartphone 300, and the probe request and the acknowledgement of the second smartphone 400 which are transmitted from the second smartphone 400. The receiving unit 201 may receive the probe request after receiving the invitation request.

The confirmation unit 203 confirms whether or not the MAC address in the probe request corresponds to the MAC address of the smartphone to which the invitation request is made.

When the confirmation unit 203 confirms that the MAC addresses correspond, the transmission unit 202 transmits a probe response to the second smartphone 400. The probe response has vendor specific, and information about start of an easy connection may be put in the vendor specific by the connection unit 204.

When the receiving unit 201 receives the acknowledgement from the second smartphone 400 after the transmission unit 202 transmits the probe response, the connection unit 204 starts an easy connection to the second smartphone 400. The easy connection may conform to an easy connection such as WPS or Rakuraku Wireless Start. By an operation according to the present scheme, an operation of the easy connection is started without such a connection start operation as physically pressing a button provided in a housing of the access point 200.

Moreover, it is assumed that when the receiving unit 201 receives an invitation request, the connection unit 204 shifts to an invitation mode for a predetermined period, and when, within this period, there is a probe request from a terminal to which the invitation request has been made, the connection unit 204 may shift to an operation for assigning this terminal to the access point 200.

The control unit 205 controls so that operations of the receiving unit 201, the transmission unit 202, the confirmation unit 203, and the connection unit 204 are linked.

The receiving unit 201 and the transmission unit 202 comprise antennas, and have circuits for performing wireless communication. The confirmation unit 203, the connection unit 204, and control unit 205 have CPUs, and are put into practice when a program is operated by the CPUs. The access point 200 may also have a memory as a storage unit for saving the received invitation request, probe request, and the like.

The first smartphone 300 comprises a receiving unit 301, a transmission unit 302, a formation unit 303, a display unit 304, and a control unit 305.

The receiving unit 301 receives a probe request transmitted from the second smartphone 400 attempting to be assigned to the access point 200. The probe request comprises a fact that the second smartphone 400 is compliant with the present scheme, and the MAC address and the terminal name of the second smartphone 400.

Figure 5:
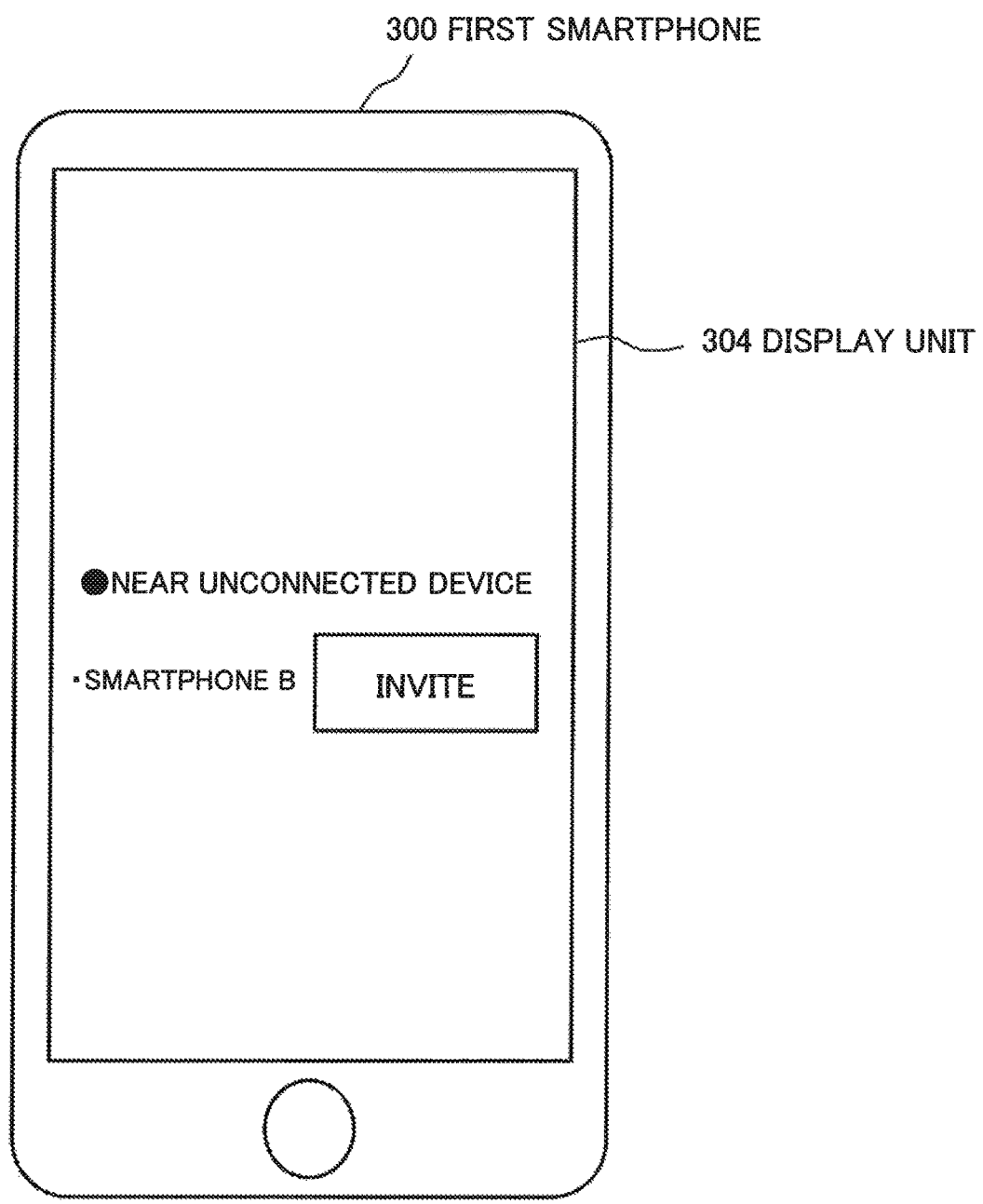
FIG. 5 is a diagram illustrating a display example of a wireless terminal according to the third example embodiment of the present invention.

FIG. 5 is a diagram illustrating a display example of the display unit 304 of the first smartphone 300. When the receiving unit 301 receives the probe request, the display unit 304 displays, to a user, the terminal name (a 'smartphone B' in FIG. 5) of the second smartphone 400, and a display ('invite' in FIG. 5) inquiring about acceptability of the invitation request, based on contents of the probe request indicating that the second smartphone 400 is compliant with the present scheme.

When a response to the inquiry from the display unit 304 is positive ('invite' is tapped in FIG. 5), the formation unit 303 forms an invitation request of the second smartphone 400. The invitation request comprises the MAC address of the second smartphone 400.

The transmission unit 302 transmits the invitation request formed in the formation unit 303 to the access point 200.

The control unit 305 controls so that operations of the receiving unit 301, the transmission unit 302, the formation unit 303, and the display unit 304 are linked.

The receiving unit 301 and the transmission unit 302 comprise antennas, and have circuits for performing wireless communication. The display unit 304 has, on its front surface, a liquid crystal monitor with a touch panel function. The formation unit 303 and the control unit 305 have CPUs, and are put into practice when a program is operated by the CPUs. The first smartphone 300 may also have a memory as a storage unit for saving the received probe request, the formed invitation request, and the like.

The second smartphone 400 comprises a receiving unit 401, a transmission unit 402, a formation unit 403, a connection unit 404, and a control unit 405.

The formation unit 403 forms a probe request. The formation unit 403 puts, in the vendor specific, a fact that the second smartphone 400 is compliant with the present scheme, and the MAC address and the terminal name of the second smartphone 400.

The transmission unit 402 periodically broadcasts the probe request. The transmission unit 402 also transmits an acknowledgement.

The receiving unit 401 receives the probe response transmitted from the access point 200.

When the receiving unit 401 receives the probe response, and the transmission unit 402 transmits, based on the probe response, an acknowledgement, the connection unit 404 starts an easy connection to the access point 200. The easy connection may conform to an easy connection such as WPS or Rakuraku Wireless Start.

The control unit 405 controls so that operations of the receiving unit 401, the transmission unit 402, the formation unit 403, and the connection unit 404 are linked.

The receiving unit 401 and the transmission unit 402 comprise antennas, and have circuits for performing wireless communication. The formation unit 403, the connection unit 404, and the control unit 405 have CPUs, and are put into practice when a program is operated by the CPUs. The second smartphone 400 may also have a memory as a storage unit for saving the formed probe request and the like.

FIG. 6 is a flowchart illustrating a wireless communication method according to the present example embodiment. The wireless communication method according to the present example embodiment relates to a wireless communication method for a wireless communication system comprising an access point 200 for wireless LAN communication, and a first smartphone 300 and a second smartphone 400 for performing wireless LAN communication with the access point 200. Further, the wireless communication method according to the present example embodiment relates to the wireless communication method wherein the first smartphone 300 is assigned to the access point 200, and the second smartphone 400 is to be assigned to the access point 200.

First, the second smartphone 400 transmits a probe request. When receiving the probe request, the first smartphone 300 forms an invitation request of the second smartphone 400, and transmits the invitation request to the access point 200. It is assumed that when receiving the invitation request, the access point 200 shifts to an invitation mode for a predetermined period, and when, within this period, there is a probe request from a terminal to which the invitation request has been made, the access point 200 may shift to an operation for assigning this terminal to the access point 200 itself.

When receiving a probe request within the invitation mode period, the access point 200 confirms whether or not the MAC address in the probe request corresponds to the MAC address in the invitation request. When confirming the correspondence, the access point 200 transmits a probe response to the second smartphone 400.

When receiving the probe response, the second smartphone 400 transmits an acknowledgement to the access point 200. An easy connection is started between the access point 200 and the second smartphone 400.

According to the present example embodiment, it is possible to assign an unassigned smartphone to an access point only by an easy operation of an assigned smartphone. Further, when a connection of the unassigned smartphone to the access point is started, an SSID and an encrypted password are not broadcast, which provides satisfactory security. Moreover, even when an assigned smartphone receives a probe request from an unassigned smartphone, and transmits an invitation request to an access point, a wireless LAN between the assigned smartphone and the access point is not obstructed. Furthermore, a connection between the unassigned smartphone and the access point can be started without any physical button operation, so that the access point, even when located at a far position, is connectable as far as communication is possible.

As described above, according to the present example embodiment, it is possible to provide a method which does not cause degradation of security and communication obstruction in an assigned terminal and is not limited by a button operation when an unassigned terminal is assigned to an access point by use of the assigned terminal.

Fourth Example Embodiment

FIG. 7 is a block diagram illustrating a configuration of a wireless communication system according to a fourth example embodiment of the present invention. A wireless communication system 500 according to the present example embodiment has a configuration in which functions provided in the first smartphone 300 of the wireless communication system 100 according to the third example embodiment are incorporated in an access point 600.

The wireless communication system 500 comprises the access point 600 for wireless LAN communication, and a smartphone 700 for performing wireless LAN communication with the access point 600. When the smartphone 700 is to be assigned to the access point 600, the smartphone 700, first, periodically broadcasts a probe request for its own representation.

The smartphone 700 puts, in vendor specific provided in the probe request, a fact that the smartphone 700 is compliant with the present scheme, and a MAC address, a terminal name, and a PIN code of the smartphone 700.

When receiving the probe request, the access point 600 inquires about acceptability of an invitation request of the smartphone 700, based on contents of the probe request indicating that the smartphone 700 is compliant with the present scheme. It is assumed that when the invitation request is acceptable, the access point 600 shifts to an invitation mode for a predetermined period, and may shift to an operation for assigning, to the access point 600 itself, a terminal making the probe request within this period.

When receiving a probe request within the invitation mode period, the access point 600 confirms whether or not the MAC address in this probe request corresponds to the MAC address in the probe request having caused the shift to the invitation mode. When confirming the correspondence, the access point 600 transmits a probe response to the smartphone 700.

When receiving the probe response, the smartphone 700 transmits an acknowledgement (ACK) to the access point 600. An easy connection is started between the access point 600 and the smartphone 700.

The access point 600 comprises a receiving unit 601, a transmission unit 602, a confirmation unit 603, a connection unit 604, a display unit 605, and a control unit 606.

The receiving unit 601 receives the probe request and the acknowledgement transmitted from the smartphone 700.

When the receiving unit 601 receives the probe request, the display unit 605 displays, to a user, the terminal name of the smartphone 700, and a display inquiring about acceptability of the invitation request, based on contents of the probe request indicating that the smartphone 700 is compliant with the present scheme.

It is assumed that when receiving a response indicating that the invitation request is acceptable by tapping or the like of the display inquiring about the acceptability of the invitation request, the connection unit 604 shifts to an invitation mode for a predetermined period, and may shift to an operation for assigning, to the access point 600, a terminal making the probe request within this period.

When the receiving unit 601 receives a probe request within the invitation mode period, the confirmation unit 603 confirms whether or not the MAC address in the received probe request corresponds to the MAC address in the probe request having caused the shift to the invitation mode.

When the confirmation unit 603 confirms the correspondence, the transmission unit 602 transmits a probe response to the smartphone 700. The probe response has vendor specific, and information about start of an easy connection may be put in the vendor specific by the connection unit 604.

When the receiving unit 601 receives the acknowledgement from the smartphone 700 after the transmission unit 602 transmits the probe response, the connection unit 604 starts an easy connection to the smartphone 700. The easy connection may conform to an easy connection such as WPS or Rakuraku Wireless Start.

The control unit 606 controls so that operations of the receiving unit 601, the transmission unit 602, the confirmation unit 603, the connection unit 604, and the display unit 605 are linked.

The receiving unit 601 and the transmission unit 602 comprise antennas, and have circuits for performing wireless communication. The display unit 605 has, on its front surface, a liquid crystal monitor with a touch panel function. The confirmation unit 603, the connection unit 604, and the control unit 606 have CPUs, and are put into practice when a program is operated by the CPUs. The access point 600 may also have a memory as a storage unit for saving the received invitation request, probe request, and the like.

The smartphone 700 comprises a receiving unit 701, a transmission unit 702, a formation unit 703, a connection unit 704, and a control unit 705.

The formation unit 703 forms a probe request. The formation unit 703 puts, in the vendor specific of the probe request, a fact that the smartphone 700 is compliant with the present scheme, and the MAC address and the terminal name of the smartphone 700.

The transmission unit 702 periodically broadcasts a probe request. The transmission unit 702 also transmits an acknowledgement.

The receiving unit 701 receives the probe response transmitted from the access point 600.

When the receiving unit 701 receives the probe response, and the transmission unit 702 transmits, based on the probe response, an acknowledgement, the connection unit 704 starts an easy connection to the access point 600. The easy connection may conform to an easy connection such as WPS or Rakuraku Wireless Start.

The control unit 705 controls so that operations of the receiving unit 701, the transmission unit 702, the formation unit 703, and the connection unit 704 are linked.

The receiving unit 701 and the transmission unit 702 comprise antennas, and have circuits for performing wireless communication. The formation unit 703, the connection unit 704, and the control unit 705 have CPUs, and are put into practice when a program is operated by the CPUs. The smartphone 700 may also have a memory as a storage unit for saving the formed probe request and the like.

FIG. 8 is a flowchart illustrating a wireless communication method according to the present example embodiment. The wireless communication method according to the present example embodiment relates to a wireless communication method for a wireless communication system comprising an access point 600 for wireless LAN communication, and a smartphone 700 for performing wireless LAN communication with the access point 600. The wireless communication method according to the present example embodiment is a wireless communication method for a wireless communication system 500 having a configuration in which the functions provided in the first smartphone 300 of the wireless communication system 100 according to the third example embodiment are incorporated in the access point 600, wherein the smartphone 700 is to be assigned to the access point 600.

First, the smartphone 700 transmits a probe request. When receiving the probe request, the access point 600 displays, to a user, the terminal name of the smartphone 700, and a display inquiring about acceptability of the invitation request, based on contents of the probe request indicating that the smartphone 700 is compliant with the present scheme. It is assumed that when receiving a response indicating that the invitation request is acceptable by tapping or the like of the display inquiring about the acceptability of the invitation request, the access point 600 shifts to an invitation mode for a predetermined period, and when receiving a probe request within this period, the access point 600 may shift to an operation for assigning a terminal which has made the probe request to the access point 600 itself.

When receiving a probe request within the invitation mode period, the access point 600 confirms whether or not the MAC address in the probe request corresponds to the MAC address in the probe request having caused the shift to the invitation mode. When confirming the correspondence, the access point 600 transmits a probe response to the smartphone 700.

When receiving the probe response, the smartphone 700 transmits an acknowledgement to the access point 600. An easy connection is started between the access point 600 and the smartphone 700.

According to the present example embodiment, it is possible to assign a smartphone to an access point only by an easy operation of the access point. Further, when a connection of the smartphone to the access point is started, an SSID and an encrypted password are not broadcast, which provides satisfactory security.

The present invention is not limited to the example embodiments described above, and various modifications may be made within the scope of the invention set forth in CLAIMS, and also fall within the scope of the present invention.

Furthermore, some or all of the example embodiments described above may also be described as in Supplementary notes below, but the present invention is not limited to the followings.

(Supplementary Note 1)

A wireless communication system comprising a wireless-communication repeater; and first and second wireless terminals for wirelessly communicating with the repeater, the first wireless terminal being assigned to the repeater, and the second wireless terminal attempting to be assigned to the repeater, wherein the second wireless terminal transmits a presence notification;

when receiving the presence notification, the first wireless terminal transmits an invitation request based on the presence notification to the repeater;

when receiving the invitation request, further receiving the presence notification, and confirming that the invitation request and the presence notification both pertain to the second wireless terminal, the repeater transmits a connection start request to the second wireless terminal;

when receiving the connection start request, the second wireless terminal transmits a connection start response to the repeater; and a connection is started between the repeater and the second wireless terminal.

(Supplementary Note 2)

The wireless communication system according to Supplementary note 1, wherein the wireless communication is wireless LAN communication, and the repeater is an access point of the wireless LAN communication.

(Supplementary Note 3)

The wireless communication system according to Supplementary note 1 or 2, wherein the presence notification and the invitation request comprise a MAC address of the second wireless terminal.

(Supplementary Note 4)

The wireless communication system according to any one of Supplementary notes 1 to 3, wherein, when receiving the presence notification, the first wireless terminal performs a display inquiring about acceptability of the invitation request, and when receiving a response indicating that the invitation request is acceptable, the first wireless terminal transmits the invitation request.

(Supplementary Note 5)

The wireless communication system according to any one of Supplementary notes 1 to 4, wherein when receiving the invitation request, the repeater shifts to an invitation mode period, and when receiving the presence notification within the invitation mode period, the repeater transmits the connection start request to the second wireless terminal.

(Supplementary Note 6)

The wireless communication system according to any one of Supplementary notes 1 to 5, wherein a connection between the repeater and the second wireless terminal is made by an easy connection function.

(Supplementary Note 7)

A wireless communication system comprising:

a wireless terminal which transmits a presence notification; and a repeater which receives the presence notification, sets, based on the presence notification, an invitation mode period, and transmits a connection start request to the wireless terminal when again receiving the presence notification within the invitation mode period, wherein the wireless terminal transmits a connection start response to the repeater when receiving the connection start request, and a connection is started between the repeater and the wireless terminal.

(Supplementary Note 8)

The wireless communication system according to Supplementary note 7, wherein the wireless communication is wireless LAN communication, and the repeater is an access point of the wireless LAN communication.

(Supplementary Note 9)

The wireless communication system according to Supplementary note 7 or 8, wherein when receiving the presence notification, the repeater performs a display inquiring of a user about acceptability of providing the invitation mode period, and on receipt of a response indicating that providing the invitation mode period is acceptable, the repeater sets the invitation mode period.

(Supplementary Note 10)

A wireless communication method for a wireless communication system comprising a wireless-communication repeater; and first and second wireless terminals for wirelessly communicating with the repeater, the first wireless terminal being assigned to the repeater, and the second wireless terminal attempting to be assigned to the repeater, wherein the second wireless terminal transmits a presence notification;

when receiving the presence notification, the first wireless terminal transmits an invitation request based on the presence notification to the repeater;

when receiving the invitation request, further receiving the presence notification, and confirming that the invitation request and the presence notification both pertain to the second wireless terminal, the repeater transmits a connection start request to the second wireless terminal;

when receiving the connection start request, the second wireless terminal transmits a connection start response to the repeater; and a connection is started between the repeater and the second wireless terminal.

(Supplementary Note 11)

The wireless communication method according to Supplementary note 10, wherein the wireless communication is wireless LAN communication, and the repeater is an access point of the wireless LAN communication.

(Supplementary Note 12)

The wireless communication method according to Supplementary note 10 or 11, wherein the presence notification and the invitation request comprise a MAC address of the second wireless terminal.

(Supplementary Note 13)

The wireless communication method according to any one of Supplementary notes 10 to 11, wherein when receiving the presence notification, the first wireless terminal performs a display inquiring about acceptability of the invitation request, and when receiving a response indicating that the invitation request is acceptable, the first wireless terminal transmits the invitation request.

(Supplementary Note 14)

The wireless communication method according to any one of Supplementary notes 10 to 13, wherein when receiving the invitation request, the repeater shifts to an invitation mode period, and when receiving the presence notification within the invitation mode period, the repeater transmits the connection start request to the second wireless terminal.

(Supplementary Note 15)

The wireless communication method according to any one of Supplementary notes 10 to 14, wherein a connection between the repeater and the second wireless terminal is made by an easy connection function.

(Supplementary Note 16)

A wireless communication method, wherein a wireless terminal transmits a presence notification;

a repeater sets, based on the presence notification, an invitation mode period when receiving the presence notification, and transmits a connection start request to the wireless terminal when again receiving the presence notification within the invitation mode period;

when receiving the connection start request, the wireless terminal transmits a connection start response to the repeater; and a connection is started between the repeater and the wireless terminal.

(Supplementary Note 17)

The wireless communication method according to Supplementary note 16, wherein the wireless communication is wireless LAN communication, and the repeater is an access point of the wireless LAN communication.

(Supplementary Note 18)

The wireless communication method according to Supplementary note 16 or 17, wherein when receiving the presence notification, the repeater performs a display inquiring of a user about acceptability of providing the invitation mode period, and on receipt of a response indicating that providing the invitation mode period is acceptable, the repeater sets the invitation mode period.

(Supplementary Note 19)

A repeater comprising:

a receiving unit which receives an invitation request of an unassigned wireless terminal transmitted from an assigned wireless terminal, and a presence notification and a connection start response of the unassigned wireless terminal which are transmitted from the unassigned wireless terminal;

a confirmation unit which confirms that the invitation request and the presence notification both pertain to the unassigned wireless terminal;

a transmission unit which transmits a connection start request to the unassigned wireless terminal, based on the confirmation; and a connection unit which starts a connection to the unassigned wireless terminal when the receiving unit receives the connection start response after the transmission unit transmits the connection start request.

(Supplementary Note 20)

The repeater according to Supplementary note 19, wherein the receiving unit receives the presence notification after receiving the invitation request.

(Supplementary Note 21)

The repeater according to Supplementary note 19 or 20, wherein the receiving unit receives the invitation request and the presence notification which comprise a MAC address of the unassigned wireless terminal.

(Supplementary Note 22)

The repeater according to any one of Supplementary notes 19 to 21, wherein when the receiving unit receives the invitation request, the connection unit shifts to an invitation mode period, and when the receiving unit receives the presence notification within the invitation mode period, the connection unit instructs the transmission unit to transmit the connection start request.

(Supplementary Note 23)

The repeater according to any one of Supplementary notes 19 to 22, wherein a connection to the unassigned wireless terminal is made by an easy connection function.

(Supplementary Note 24)

A repeater comprising:

a receiving unit which receives a presence notification and a connection start response from a wireless terminal;

a connection unit which sets, based on the presence notification, an invitation mode period; and a transmission unit which transmits a connection start request to the wireless terminal when again receiving the presence notification within the invitation mode period, wherein when the receiving unit receives the connection response to the connection start request, the connection unit starts a connection to the wireless terminal.

(Supplementary Note 25)

The repeater according to Supplementary note 24, further comprising a display unit which performs a display inquiring of a user about acceptability of providing the invitation mode period when the receiving unit receives the presence notification, wherein on receipt of a response indicating that providing the invitation mode period is acceptable, the connection unit sets the invitation mode period.

(Supplementary Note 26)

A wireless terminal comprising:

a receiving unit which receives a presence notification transmitted from an unassigned wireless terminal attempting to be assigned to a wireless-communication repeater;

a formation unit which forms an invitation request of the unassigned wireless terminal on receipt of the presence notification; and a transmission unit which transmits the invitation request to the repeater.

(Supplementary Note 27)

The wireless terminal according to Supplementary note 26, wherein the wireless communication is wireless LAN communication, and the repeater is an access point of the wireless LAN communication.

(Supplementary Note 28)

The wireless terminal according to Supplementary note 26 or 27, wherein the receiving unit receives the presence notification which comprises a MAC address of the unassigned wireless terminal.

(Supplementary Note 29)

The wireless terminal according to any one of Supplementary notes 26 to 28, wherein the formation unit forms the invitation request which comprises a MAC address of the unassigned wireless terminal.

(Supplementary Note 30)

The wireless terminal according to any one of Supplementary notes 26 to 29, further comprising a display unit which performs a display inquiring about acceptability of the invitation request of the unassigned wireless terminal when receiving the presence notification, wherein when receiving a response indicating that the invitation request is acceptable, the formation unit forms the invitation request.

(Supplementary Note 31)

A wireless terminal comprising:

a transmission unit which transmits a presence notification;

a receiving unit which receives a connection start request transmitted based on an invitation request and the presence notification by a repeater, the invitation request being formed based on the presence notification and transmitted by an assigned wireless terminal assigned to the repeater; and a connection unit which connects to the repeater, wherein when the receiving unit receives the connection start request, and the transmission unit transmits, based on the connection start request, a connection start response, the connection unit starts the connection.

(Supplementary Note 32)

The wireless terminal according to Supplementary note 31, wherein the repeater is an access point of wireless LAN communication.

(Supplementary Note 33)

The wireless terminal according to Supplementary note 31 or 32, wherein the presence notification and the invitation request comprise a MAC address.

(Supplementary Note 34)

The wireless terminal according to any one of Supplementary notes 31 to 33, wherein a connection to the repeater is made by an easy connection function.

(Supplementary Note 35)

A wireless communication system comprising a wireless-communication repeater; and first and second wireless terminals for wirelessly communicating with the repeater, the first wireless terminal being assigned to the repeater, and the second wireless terminal attempting to be assigned to the repeater, wherein the second wireless terminal transmits a presence notification and an assignment request;

when receiving the presence notification, the first wireless terminal transmits an invitation request based on the presence notification to the repeater;

when receiving the invitation request, further receiving the assignment request, and confirming that the invitation request and the assignment request both pertain to the second wireless terminal, the repeater transmits a connection start request to the second wireless terminal;

when receiving the connection start request, the second wireless terminal transmits a connection start response to the repeater; and a connection is started between the repeater and the second wireless terminal.

(Supplementary Note 36)

A wireless communication method for a wireless communication system comprising a wireless-communication repeater; and first and second wireless terminals for wirelessly communicating with the repeater, the first wireless terminal being assigned to the repeater, and the second wireless terminal attempting to be assigned to the repeater, wherein the second wireless terminal transmits a presence notification and an assignment request;

when receiving the presence notification, the first wireless terminal transmits an invitation request based on the presence notification to the repeater;

when receiving the invitation request, further receiving the assignment request, and confirming that the invitation request and the assignment request both pertain to the second wireless terminal, the repeater transmits a connection start request to the second wireless terminal;

when receiving the connection start request, the second wireless terminal transmits a connection start response to the repeater; and a connection is started between the repeater and the second wireless terminal.

(Supplementary Note 37)

A wireless terminal comprising:

a transmission unit which transmits a presence notification and an assignment request;

a receiving unit which receives a connection start request transmitted based on an invitation request and the assignment request by a repeater, the invitation request being formed based on the presence notification and transmitted by an assigned wireless terminal assigned to the repeater; and a connection unit which connects to the repeater, wherein when the receiving unit receives the connection start request, and the transmission unit transmits, based on the connection start request, a connection start response, the connection unit starts the connection.

This application is based upon and claims the benefit of priority from Japanese patent application No. 2015-162494, filed on Aug. 20, 2015, the disclosure of which is incorporated herein in its entirety by reference.

REFERENCE SIGNS LIST 1, 10, 100, 500 Wireless communication system
2 Repeater
20, 200, 600 Access point
21, 201, 601 Receiving unit
22, 202, 602 Transmission unit
23, 203, 603 Confirmation unit
24, 204, 604 Connection unit
25, 205, 606 Control unit
605 Display unit
3, 30 First wireless terminal
4, 40 Second wireless terminal
300 First smartphone
400 Second smartphone
700 Smartphone
31, 41, 301, 401, 701 Receiving unit
32, 42, 302, 402, 702 Transmission unit
33, 43, 303, 403, 703 Formation unit
34, 304 Display unit
44, 404, 704 Connection unit
35, 45, 305, 405, 705 Control unit

What is claimed is:

1. A wireless communication system comprising:

a wireless-communication repeater; and first and second wireless terminals for wirelessly communicating with the repeater, wherein, when the first wireless terminal is assigned to the repeater, and the second wireless terminal attempts to be assigned to the repeater, the second wireless terminal transmits a presence notification;

when receiving the presence notification, the first wireless terminal transmits an invitation request based on the presence notification to the repeater;

when receiving the invitation request, further receiving the presence notification, and confirming that the invitation request and the presence notification both pertain to the second wireless terminal, the repeater transmits a connection start request to the second wireless terminal;

when receiving the connection start request, the second wireless terminal transmits a connection start response to the repeater; and connection is started between the repeater and the second wireless terminal.

2. The wireless communication system according to claim 1, wherein, the wireless communication is wireless LAN communication, and the repeater is an access point of the wireless LAN communication.

3. The wireless communication system according to claim 1, wherein, the presence notification and the invitation request comprise a MAC address of the second wireless terminal.

4. The wireless communication system according to claim 1, wherein, when receiving the presence notification, the first wireless terminal performs a display inquiring about acceptability of the invitation request, and when receiving a response indicating that the invitation request is acceptable, the first wireless terminal transmits the invitation request.

5. The wireless communication system according to claim 1, wherein, when receiving the invitation request, the repeater shifts to an invitation mode period, and when receiving the presence notification within the invitation mode period, the repeater transmits the connection start request to the second wireless terminal.

6. The wireless communication system according to claim 1, wherein the repeater comprises:

a memory storing a program including instructions; and a processor configured to execute the program to perform the instructions including:

receiving an invitation request of an unassigned wireless terminal transmitted from an assigned wireless terminal, and a presence notification and a connection start response of the unassigned wireless terminal which are transmitted from the unassigned wireless terminal;

confirming that the invitation request and the presence notification both pertain to the unassigned wireless terminal;

transmitting a connection start request to the unassigned wireless terminal, based on the confirmation; and a connection unit for starting connection to the unassigned wireless terminal when the receiving the connection start response after transmitting the connection start request.

7. The wireless communication system according to claim 1, wherein the first wireless terminal comprises:

a memory storing a program including instructions; and a processor configured to execute the program to perform the instructions including:

receiving a presence notification transmitted from an unassigned wireless terminal attempting to be assigned to a wireless-communication repeater;

forming an invitation request of the unassigned wireless terminal on receipt of the presence notification; and transmitting the invitation request to the repeater.

8. The wireless communication system according to claim 1, wherein the second wireless terminal comprises:

a memory storing a program including instructions; and a processor configured to execute the program to perform the instructions including:

transmitting a presence notification;

receiving a connection start request transmitted by a repeater, based on an invitation request and the presence notification, the invitation request being formed based on the presence notification and transmitted by an assigned wireless terminal assigned to the repeater; and starting connection to the repeater upon receiving the connection start request, and transmitting, based on the connection start request, a connection start response.

9. A wireless communication method for a wireless communication system comprising a wireless-communication repeater, and first and second wireless terminals for wirelessly communicating with the repeater, in which the first wireless terminal is assigned to the repeater, and the second wireless terminal attempts to be assigned to the repeater, the method comprising:

by the second wireless terminal, transmitting a presence notification;

when receiving the presence notification, by the first wireless terminal, transmitting an invitation request based on the presence notification to the repeater;

when receiving the invitation request, further receiving the presence notification, and confirming that the invitation request and the presence notification both pertain to the second wireless terminal, by the repeater, transmitting a connection start request to the second wireless terminal;

when receiving the connection start request, by the second wireless terminal, transmitting a connection start response to the repeater; and starting connection between the repeater and the second wireless terminal.

10. The wireless communication method according to claim 9, wherein the wireless communication is wireless LAN communication, and the repeater is an access point of the wireless LAN communication.

11. The wireless communication method according to claim 9, wherein the presence notification and the invitation request comprise a MAC address of the second wireless terminal.

12. The wireless communication method according to claim 9, wherein when receiving the presence notification, the first wireless terminal performs a display inquiring about acceptability of the invitation request, and when receiving a response indicating that the invitation request is acceptable, the first wireless terminal transmits the invitation request.

13. The wireless communication method according to claim 9, wherein when receiving the invitation request, the repeater shifts to an invitation mode period, and when receiving the presence notification within the invitation mode period, the repeater transmits the connection start request to the second wireless terminal.

14. A repeater comprising:

a memory storing a program including instructions: and a processor configured to execute the program to perform the instructions including:

receiving an invitation request of an unassigned wireless terminal transmitted from an assigned wireless terminal, and a presence notification and a connection start response of the unassigned wireless terminal which are transmitted from the unassigned wireless terminal;

confirming that the invitation request and the presence notification both pertain to the unassigned wireless terminal;

transmitting a connection start request to the unassigned wireless terminal, based on the confirmation; and starting connection to the unassigned wireless terminal upon receiving the connection start response after transmitting the connection start request.

15. The repeater according to claim 14, wherein the processor is further configured to receive the presence notification after receiving the invitation request.

16. The repeater according to claim 14, wherein the processor is further configured to receive the invitation request and the presence notification which comprise a MAC address of the unassigned wireless terminal.

17. The repeater according to claim 14, wherein the processor is further configured to, when receiving the invitation request, shift to an invitation mode period, and when receiving the presence notification within the invitation mode period, instruct to transmit the connection start request.

* * * * *